Patented Nov. 22, 1949

2,488,530

UNITED STATES PATENT OFFICE 2,488,530

FELDSPAR - IRON - ALKALI FISCHER-TROPSCH CATALYST AND ITS PREPARATION

Alvin H. Friedman and Jesse N. Moran, Bartlesville, Okla., assignors to Phillips Petroleum Company, a corporation of Delaware No Drawing. Application February 10, 1947, Serial No. 727,726

11 Claims. (Cl. 252—459)

This invention relates to the synthesis of hydrocarbons by the reduction of carbon monoxide with hydrogen. In one aspect it relates to a new and novel catalyst for this synthesis and to the method of making such a catalyst.

In the process of synthesizing hydrocarbons which is commonly designated the Fischer-Tropsch synthesis, carbon monoxide and hydrogen are reacted at elevated temperatures in the presence of a suitable catalyst to yield hydrocarbons of the constitution ranging from methane to a wax and small amounts of oxygenated material. The catalysts usually used for this synthesis are cobalt, iron, nickel and ruthenium which may be promoted with the alkali metals, alkaline earths, or their oxides, or with thoria or various other promoters and the catalysts may be supported on an inert support such as kieselguhr and the like. When a support is employed it has been the practice to dissolve the active catalytic material and the promoters in a suitable liquid medium and to mix the resulting solution with the support whereupon the promoters and active catalyst material are precipitated from their solution by means of an alkaline solution. The resulting catalyst is made into pellets or granules for the synthesis reaction. Such pallets or granules are employed in the form of a fixed bed of catalyst. When a fluidized catalyst modification of this synthesis is employed, in which the catalyst is used in the form of a freely flowing powder which is readily suspended in the gaseous material passing through the reaction zone we have found that it is advantageous to use no support, in the sense of an inert diluent material upon which is deposited the active catalytic material. In practicing such fluidized operation in accordance with the present invention we fuse the active promoter material into the catalyst and grind the resulting hard mass to a relatively hard, abrasion-resistant powder ideally suited for this type of operation.

The principal object of the present invention is to provide an improved form of catalyst for the synthesis of hydrocarbons by the reduction of carbon monoxide with hydrogen. Another object is to provide an improved catalyst for such synthesis when conducted in the fluidized catalyst modification in which the catalyst in finely divided form is suspended in the flowing gaseous reaction mixture. Another object is to provide a process of making such an improved catalyst. Another object is to reduce the formation of carbon in the synthesis of hydrocarbons by the catalytic reduction of carbon monoxide with hydrogen. Another object is to reduce the formation of wax in such synthesis. Another object is to facilitate catalyst fluidization in a fluidized catalyst type of operation. Many other objects will more fully hereinafter appear.

We have now found that it is highly advantageous to employ in the synthesis of hydrocarbons by the so-called Fischer-Tropsch method a reduced ground fused mixture of iron oxide and a mixed silicate of aluminum and a metal selected from the group consisting of the alkali and alkaline earth metals. Our invention is based on the discovery that highly advantageous results are obtained if the iron oxide is fused with substantial proportions of such a mixed silicate of aluminum and an alkali or alkaline earth metal, the resulting fused mixture then being ground and reduced, usually with hydrogen, to convert the iron oxide substantially to elemental iron.

The use of a support such as has just been described is particularly advantageous in the manufacture of an iron catalyst which is to be employed in the fluidized process of reducing carbon monoxide with hydrogen to make hydrocarbons. Without a support such as is employed in accordance with the present invention, the finished iron catalyst has a bulk density of about 2.4. However by employment of the supports of the present invention, the bulk density of the iron catalyst can be decreased to as low as 1.8 or even lower. Thus by fusing the iron oxide with an equal weight of feldspar, followed by cooling, grinding to desired particle size suitable for use in the fluidized process, and reduction with hydrogen, the bulk density of the resulting powdered catalyst ready for use may be as low as 1.8. This decrease in density is of great advantage in that the lighter catalyst fluidizes more readily in the influent synthesis gas and less weight of catalyst is necessary.

We may use any natural or synthetic mixed silicate of aluminum and an alkali or alkaline earth metal in the practice of the present invention. Probably the most readily available and most economical mixed silicate for use in the present invention is feldspar. As is well known the term "feldspar" designates a group of related minerals composed of monoclinic and triclinic silicates of aluminum with alkali or alkaline earth metals, commonly potassium, sodium and calcium. Samples of minerals coming within the term feldspar are andesine, albite, anorthoclase, anorthite, labradorite, microcline, orthoclase and oligoclase. However our invention is not restricted to the use of feldspar. Examples of material other than feldspar which may be employed are micas such as muscovite, lepidolite, and biotite. We may also use mixed silicates of aluminum and alkali or alkaline earth metals which are designated as feldspathoids such as leucite and materials classified as zeolites such as analcite, stilbite. Other materials which may be employed in practicing the present invention are marialite, petalite, etc. It will be seen that the presence of elements other than aluminum and alkali or alkaline earth metals in the mixed silicate is not precluded. Examples of such other elements are halogens. For example lepidolite contains fluorine, marialite contains chlorine. Combined hydrogen may also be present as a base.

The first step in the manufacture in accordance with the present invention is to convert the metallic iron to iron oxide. We prefer to do this in such manner that ferroso-ferric oxide, $Fe_3O_4$, is obtained. This is best accomplished by burning the metallic iron in oxygen. Alternatively, natural ferroso-ferric oxide, such as magnetite, may be used as a starting material. This material may be purified preliminarily, if desired.

The iron oxide is then mixed with a suitable proportion of the mixed silicate of aluminum and an alkali or alkaline earth metal and the resulting mixture is fused in any suitable manner. If desired the mixture may be agitated during the fusion step by a stream of oxygen. For example a jet of oxygen may be directed on or below the surface of the mixture undergoing fusion. After a uniform fused mixture is obtained, it is allowed to cool to a temperature suitable for grinding and the resulting material is then ground in any suitable manner to a suitable fineness. Where it is to be employed in the fluidized type of reaction it is preferred to grind it to a fineness such that it will pass a 65-mesh screen but be substantially completely retained by a 300-mesh screen or even higher. A catalyst of such particle size appears to be most suitable for use in a fluidized process since it is fine enough so that it is readily suspended in the gaseous stream or streams coming into the reactor and yet it is not so fine as to interfere with its ready separation from the effluent gases.

The resulting powdered material is then reduced to effect reduction of the iron oxide substantially to the form of elemental iron. This is most conveniently accomplished by means of hydrogen gas at an elevated temperature. For example the powdered material may be reduced with hydrogen at 450 to 550° C. for 48 hours. The resulting catalyst is now ready for use.

The proportions of iron oxide and the mixed silicate employed in accordance with the present invention may be varied over wide limits. Practical proportions may range from 20 to 75 per cent of feldspar based on the combined weight of iron oxide and mixed silicate. Frequently a preferred proportion is 50 per cent of iron oxide and 50 per cent of the mixed silicate.

We have further found that the use of a mixed silicate which contains potassium or sodium or other alkali metal or alkaline earth metal in combination with alumina and silica also acts as an effective promoter for the synthesis reaction. The alkali metal or alkaline earth metal oxide is present in the mixed silicate in a suitable form to act as a promoter for the iron catalyst. This is particularly the case where the alkali metal or alkaline earth metal oxide and the weakly acidic silica and alumina are present in simple molecular proportions.

However while the mixed silicate employed in accordance with the present invention serves as a promoter because of its content of alkali metal or alkaline earth metal, additional activators such as potassia, potassium nitrate and the like may be incorporated in the catalysts of the present invention. Such incorporation of extraneous promoters may be effected in any suitable way.

The catalyst prepared as described above is employed in the synthesis of hydrocarbons by the reduction of carbon monoxide with hydrogen. The usual reaction conditions for the synthesis are employed. The reaction conditions used do not form part of the present invention. The synthesis reaction is usually carried out at pressures ranging from atmospheric to moderately superatmospheric, depending on the composition of product desired. A preferred range of pressures suitable for general use is from 5 to 20 atmospheres. Temperatures ranging from 175 to 325° C. may be employed. The flow rate is variable depending upon many factors. Increasing contact time results in somewhat lower operating temperatures and higher yields per pass with less formation of methane. In order to obtain a satisfactory rate of production, suitably rapid flow rates must be employed. Space velocities ranging from 1000 to 30,000 cubic feet of synthesis gas per hour per cubic foot of catalyst may be employed.

It is preferred to employ the fluidized mode of operation. Such operation of the Fischer-Tropsch process is now well known to the art and need not be described in detail. In such operation the finely divided catalyst is suspended in the incoming gas stream and the resulting suspension is maintained in the reactor for the desired period of time. If desired hindered settling may be provided. In the hindered settling type of fluidized operation, a dense phase of catalyst suspension in gas is maintained in the lower portion of the reactor. The gases leaving the hindered settling zone contain only a small amount of suspended catalyst in a form resembling smoke and this type of suspension prevails in the upper portion of the reactor. The gases are withdrawn from the top of the reactor and are treated in any suitable manner to separate traces of suspended catalyst and to recover the desired product and recycle stream.

The use of relatively large quantities of the mixed silicate in the formulation of the catalyst of the present invention is highly advantageous since it enables the catalyst activity for carbon and wax production to be decreased to the point where less carbon and wax are formed as primary products in the reaction, but the catalytic activity for the synthesis of gasoline range hydrocarbons is still held at a high level. We believe that this is due to the alteration in the catalyst structure to make a harder, less porous structure in the finished catalyst granule, but we do not wish to be restricted by this theory.

What we have invented and disclosed in this specification is the use as a support and promoter of a natural mineral such as feldspar or of its synthetically prepared equivalent in the Fischer-Tropsch synthesis with the advantage, which is especially pronounced when large quantities of the mixed silicate of the order of 50 per cent are used, of decreasing the density and activity of the resulting catalyst with resultant improvement in the synthesis.

Following are two examples comparing the catalyst made with feldspar in accordance with the present invention with a corresponding catalyst containing no support.

A sample of iron wire was burned in oxygen and ground to 65/100 mesh. The bulk density of this powder was 2.4 grams per cc. This catalyst was reduced with hydrogen at 450° C. for 48 hours. Sixty cc. of this reduced catalyst was reacted with synthesis gas composed of two parts of hydrogen and one part of carbon monoxide at 150 pounds per square inch gauge and 320° C. using 2500 volumes of synthesis gas per volume of catalyst per hour. Four and one-half cc. of liquid product was made per hour, including some wax. After 56 hours the reaction was stopped and carbon and some wax was found on the catalyst.

In comparison with this run a sample of the same wire burned in oxygen was mixed with an equal weight of feldspar and fused in an oxy-hydrogen flame. It was ground to 65/100 mesh. The bulk density of this powder was 1.8. After reduction and treatment at the same conditions as in the previous example the reaction was observed to yield 6 cc. of liquid per hour, substantially all of which was in the gasoline range. After 54 hours the reaction was stopped. There was no wax on the catalyst and no evidence of carbon formation.

From the foregoing description it will be seen that many advantages flow from the practice of the present invention. An important advantage is that the density of the catalyst is greatly reduced. Another advantage is that the catalyst activity is decreased so that less carbon and wax are formed although the activity of the catalyst for the desired synthesis reactions is maintained at a high level. Another advantage is that the support also furnishes a very good promoter for the catalyst. Another advantage is that the supports are cheap and readily available, feldspar for example being a relatively abundant material in the earth's crust. Another advantage is that the preparation of the catalyst is simple and is easily carried out. Many other advantages will be apparent to those skilled in the art.

We claim:

1. As a new catalyst, particularly suited for catalyzing the synthesis of hydrocarbons by the reduction of carbon monoxide with hydrogen, a reduced particulate fused mixture of iron oxide and a mixed silicate of aluminum and a metal selected from the group consisting of the alkali and alkaline earth metals, the amount of silicate ranging from 20 to 75 weight per cent of the mixture of silicate and iron oxide, and the iron being in elemental form.

2. The catalyst of claim 1 in which said mixed silicate is feldspar.

3. The catalyst of claim 2 in which said feldspar and iron oxide are in equal proportions.

4. The process of preparing a catalyst particularly suited for catalyzing the synthesis of hydrocarbons by the reduction of carbon monoxide with hydrogen which comprises fusing iron oxide with a mixed silicate of aluminum and a metal selected from the group consisting of the alkali and alkaline earth metals, cooling and comminuting the resulting mixture, and reducing the resulting material under conditions which convert the iron oxide substantially to elemental iron.

5. The process of claim 4 wherein said mixed silicate is employed in an amount ranging from 20 to 75 per cent by weight based on the weight of said iron oxide and said mixed silicate.

6. A process of preparing a catalyst particularly suited for catalyzing the synthesis of hydrocarbons by the reduction of carbon monoxide with hydrogen which comprises burning metallic iron in oxygen, mixing the resulting oxide with feldspar, fusing the resulting mixture, cooling and dividing the resulting mixture into small aggregates, and reducing the resulting particulate material with hydrogen at an elevated temperature under conditions which convert the iron oxide to elemental iron.

7. The process of claim 6 wherein the proportions of the oxidized iron and of the feldspar are approximately equal.

8. The process of preparing a catalyst particularly suited for catalyzing the synthesis of hydrocarbons by the reduction of carbon monoxide with hydrogen which comprises burning metallic iron in oxygen, mixing the resulting iron oxide with about an equal weight of feldspar, fusing the resulting mixture in an oxy-hydrogen flame, cooling, comminuting the same to a particle size of between about 65-mesh and about 300-mesh, and reducing the resulting powdered material with hydrogen at a temperature between 450° and 550° C. until the iron in the mixture is reduced to elemental iron.

9. As a new catalyst, particularly suited for catalyzing the synthesis of hydrocarbons by the reduction of carbon monoxide with hydrogen, a reduced particulate fused mixture of feldspar and magnetite, the amount of feldspar ranging from 20 to 75 weight per cent of the mixture of feldspar and magnetite, and the iron in said magnetite being in elemental form.

10. The process of preparing a composition readily reducible to a catalyst containing elemental iron and particularly suited for catalyzing the synthesis of hydrocarbons by the reduction of carbon monoxide with hydrogen, which comprises fusing iron oxide with a mixed silicate of aluminum and a metal selected from the group consisting of alkali and alkaline earth metals, cooling the fused mass, and dividing the same into small aggregates.

11. A composition which reduces so as to form a catalyst particularly suited for catalyzing the synthesis of hydrocarbons by the reduction of carbon monoxide with hydrogen and consisting essentially of a fused mixture of iron oxide and a mixed silicate of aluminum and a metal selected from the group consisting of the alkali and alkaline earth metals in which said iron oxide is readily reducible to elemental iron.

ALVIN H. FRIEDMAN.
JESSE N. MORAN.

REFERENCES CITED

The following references are of record in the file of this patent:

UNITED STATES PATENTS

| Number | Name | Date |
| --- | --- | --- |
| 1,201,850 | Mittasch et al. | Oct. 17, 1916 |
| 1,555,505 | Larson | Sept. 29, 1925 |
| 2,203,850 | Tropsch | June 11, 1940 |
| 2,417,164 | Huber | Mar. 11, 1947 |